US010757556B2

(12) United States Patent
Hassan et al.

(10) Patent No.: US 10,757,556 B2
(45) Date of Patent: Aug. 25, 2020

(54) DEVICE-BASED ACCESS POINT ASSOCIATION AND TRACKING OF PHYSICAL ADDRESSES

(71) Applicant: Microsoft Technology Licensing, LLC, Redmond, WA (US)

(72) Inventors: Amer A. Hassan, Kirkland, WA (US); Richard James Cole, Woodinville, WA (US); Michael J. Davis, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/043,932

(22) Filed: Jul. 24, 2018

(65) Prior Publication Data

US 2020/0037140 A1     Jan. 30, 2020

(51) Int. Cl.
*H04L 29/12* (2006.01)
*H04W 4/02* (2018.01)
(Continued)

(52) U.S. Cl.
CPC ........... *H04W 4/90* (2018.02); *H04L 61/6022* (2013.01); *H04W 4/025* (2013.01); *H04W 4/029* (2018.02); *H04W 48/08* (2013.01); *H04W 88/10* (2013.01)

(58) Field of Classification Search
CPC ....... H04W 4/90; H04W 48/08; H04W 88/10; H04W 4/029; H04W 4/025; H04W 4/33;
(Continued)

(56) References Cited

U.S. PATENT DOCUMENTS 7,245,900 B1    7/2007    Lamb et al.
7,564,838 B2    7/2009    McGary
(Continued)

FOREIGN PATENT DOCUMENTS

WO    2007121331 A2    10/2007
WO    2017074814 A1    5/2017

OTHER PUBLICATIONS

"Caller Location in Support of Emergency Services", Retrieved From: http://www.eena.org/uploads/gallery/files/pdf/2014_11_21_EENA_2_2_2_v2%200_FINAL.pdf, Nov. 21, 2014, 30 Pages.
(Continued)

*Primary Examiner* — Joseph E Dean, Jr.
(74) *Attorney, Agent, or Firm* — Schwegman Lundberg & Woessner, P.A.

(57) ABSTRACT

Disclosed in various examples are methods, systems, devices, and machine-readable mediums for tracking device and access point geographic locations of wireless (e.g., Wi-Fi) networks. In an example, operations performed by a device for association and use of a location include: receiving identification information (e.g., a MAC address) that identifies an access point of a wireless network; comparing the identification information with a list of access points (e.g., a white list) to identify an unvalidated status of the access point; communicating the identification information to the communications service; receiving a validated status for the access point and a geographic location for the wireless network from the communications service; and perforating a communication action with the communication service, using the wireless network, based on the geographic location and the validated status. Further operations involving evaluating the access point status and updating the list of access points, are also disclosed.

20 Claims, 8 Drawing Sheets

(51) Int. Cl.
*H04L 29/06* (2006.01)
*H04W 12/00* (2009.01)
*H04W 4/90* (2018.01)
*H04W 4/029* (2018.01)
*H04W 48/08* (2009.01)
*H04W 88/10* (2009.01)

(58) Field of Classification Search
CPC ........... H04W 12/00503; H04W 12/08; H04W 4/021; H04L 61/6022; H04L 63/0876; H04L 63/101; H04L 67/18
See application file for complete search history.

(56) References Cited

U.S. PATENT DOCUMENTS

| | | | |
|---|---|---|---|
| 7,702,309 B2 | 4/2010 | Faccin et al. | |
| 8,718,596 B1* | 5/2014 | Xue | H04W 64/00 455/404.2 |
| 8,743,782 B1 | 6/2014 | Patel | |
| 9,258,386 B2 | 2/2016 | Croy | |
| 9,369,575 B2 | 6/2016 | Merino Gonzalez et al. | |
| 9,374,696 B2 | 6/2016 | Singer et al. | |
| 9,479,897 B2 | 10/2016 | Thompson et al. | |
| 9,641,983 B2 | 5/2017 | Venkatraman et al. | |
| 9,775,093 B2 | 9/2017 | Bonner et al. | |
| 2005/0202830 A1* | 9/2005 | Sudit | H04W 4/029 455/456.1 |
| 2007/0049323 A1* | 3/2007 | Wang | H04W 12/12 455/525 |
| 2007/0060097 A1 | 3/2007 | Edge et al. | |
| 2007/0153982 A1 | 7/2007 | Bloebaum et al. | |
| 2007/0153983 A1 | 7/2007 | Bloebaum et al. | |
| 2007/0242660 A1 | 10/2007 | Xu | |
| 2008/0304487 A1 | 12/2008 | Kotecha | |
| 2009/0210536 A1 | 8/2009 | Allen et al. | |
| 2010/0279647 A1 | 11/2010 | Jacobs et al. | |
| 2011/0013569 A1 | 1/2011 | Scherzer et al. | |
| 2011/0081911 A1 | 4/2011 | Silver | |
| 2011/0116495 A1 | 5/2011 | Purkayastha et al. | |
| 2011/0199942 A1 | 8/2011 | Zhao et al. | |
| 2012/0002646 A1 | 1/2012 | Zabawskyj et al. | |
| 2012/0157032 A1 | 6/2012 | Goodman et al. | |
| 2012/0284517 A1* | 11/2012 | Lambert | H04L 63/0823 713/169 |
| 2012/0320888 A1 | 12/2012 | Annamalai et al. | |
| 2013/0242775 A1 | 9/2013 | Taylor | |
| 2016/0021610 A1 | 1/2016 | Wan et al. | |
| 2016/0142427 A1 | 5/2016 | de los reyes et al. | |
| 2017/0325192 A1 | 11/2017 | Annamalai et al. | |
| 2017/0353892 A1 | 12/2017 | Elia et al. | |
| 2019/0037477 A1* | 1/2019 | Isola | H04W 48/04 |
| 2019/0394821 A1 | 12/2019 | Hassan et al. | |

OTHER PUBLICATIONS

Mazza, Massimo, "Lost Your Mobile Device? Here's How to Get It Back", Retrieved From: https://www.krollontrack.co.uk/blog/making-data-simple/lost-mobile-device-heres-get-back/, Jul. 7, 2017, 3 Pages.

Rowe, et al., "Define the Network Elements Used to Determine Location in Skype for Business Server 2015", Retrieved From: https://docs.microsoft.com/en-us/skypeforbusiness/plan-your-deployment/enterprise-voice-solution/network-location, Aug. 17, 2015, 3 Pages.

Williams, et al., "Handset Derived Location for Emergency Calls", In EENA NG112 Technical Committee Document, Dec. 4, 2016, 13 Pages.

"Non Final Office Action Issued in U.S. Appl. No. 16/044,180", dated Feb. 8, 2019, 19 Pages.

U.S. Appl. No. 16/044,180, filed Jul. 24, 2018, Access Point Association and Tracking of Physical Addresses.

"International Search Report and Written Opinion Issued in PCT Application No. PCT/US19/038087", dated Aug. 13, 2019, 10 Pages.

U.S. Appl. No. 16/692,618, filed Nov. 22, 2019, Access Point Association and Tracking of Physical Addresses.

"International Search Report and Written Opinion Issued in PCT Application No. PCT/US19/037565", dated Sep. 6, 2019, 13 Pages.

"International Search Report and Written Opinion Issued in PCT Application No. PCT/US19/038086", dated Sep. 18, 2019, 11 Pages.

"Notice of Allowance Issued in U.S. Appl. No. 16/019,320", dated Dec. 4, 2019, 8 Pages.

"Non Final Office Action Issued in U.S. Appl. No, 16/019,320", dated Jul. 25, 2019, 11 Pages.

"Notice of Allowance Issued in U.S. Appl. No. 16/044,180", dated Jun. 5, 2019, 7 Pages.

* cited by examiner

DEVICE-BASED ACCESS POINT ASSOCIATION AND TRACKING OF PHYSICAL ADDRESSES

RELATED APPLICATIONS

This application is related to U.S. patent application Ser. No. 16/044,180 titled "ACCESS POINT ASSOCIATION AND TRACKING OF PHYSICAL ADDRESSES", filed on Jul. 24, 2018, now issued as U.S. Pat. No. 10,512,058, the contents of which is incorporated herein by reference in its entirety.

BACKGROUND

With the widespread deployment of wireless networks and portable computing devices, a computing user may frequently operate their computing device at different locations. For instance, a user may choose to utilize a notebook computer tablet, smartphone, or other mobile computing device at an airport, home, restaurant, remote worksite, or many other private or public locations.

The mobility of computing devices and the increased prevalence of wireless network connectivity has added complexity to a variety of real-world communication scenarios, especially scenarios involving location-based services. As one example, a computing device may have robust wireless network connectivity and have the potential to establish a voice-over-IP (VoIP) call over the Internet with an emergency call service, such as a "911" calling service in the United States, from many different locations. However, if such a call is made over many VoIP services, the emergency call sen ice is unlikely to know the location of the originating call and the computing device. This limitation is also reinforced when the computing device does not include built-in location features such as GPS sensors, and where the wireless network is not aware of (or has not been provisioned with) its own location. As a result, regulatory requirements have been proposed or enacted in some jurisdictions to block emergency calls from VoIP clients entirely, to prevent emergency responders from being dispatched to an incorrect or incomplete location.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
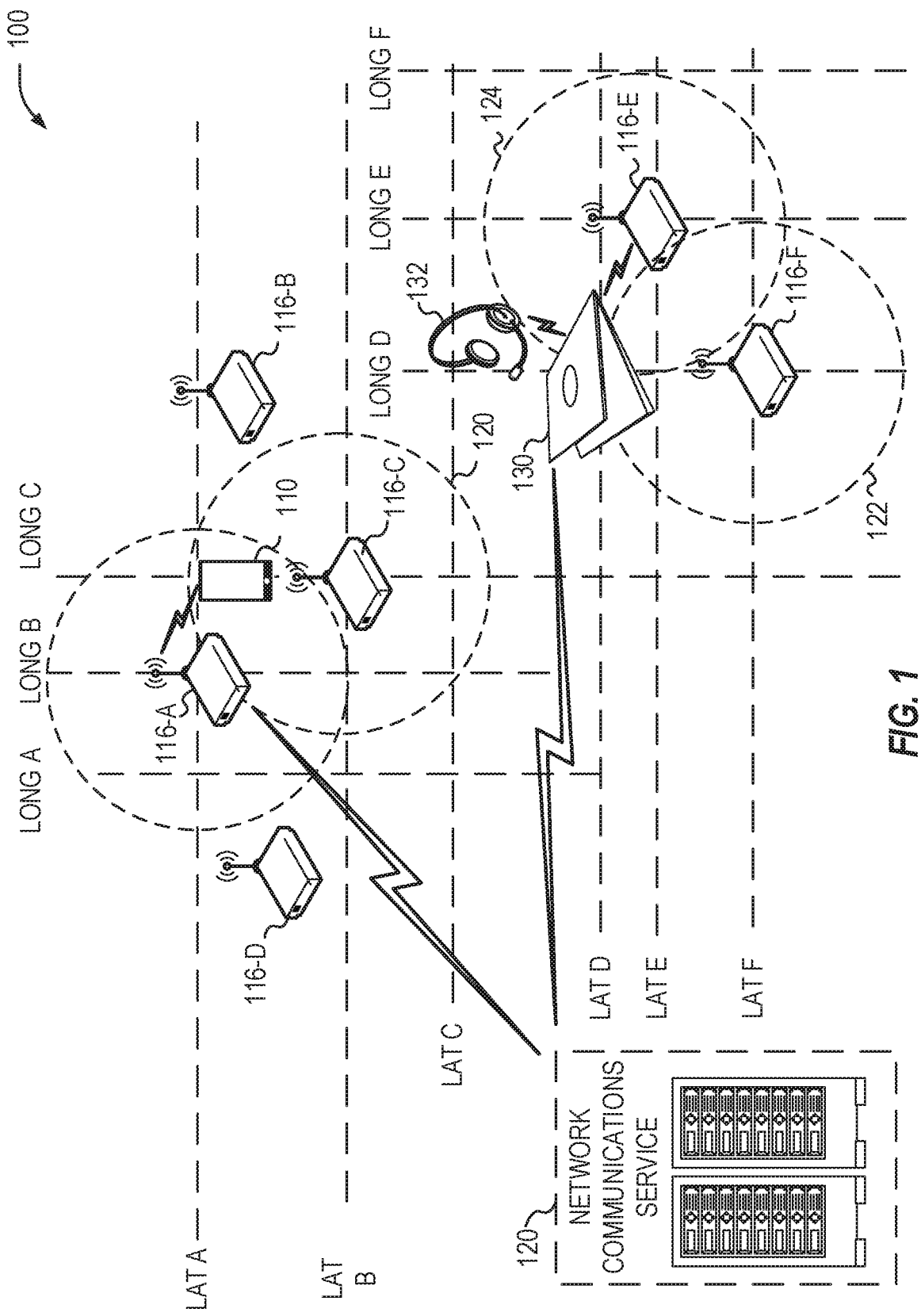
FIG. 1 depicts an example deployment of access points for communication operations, according to various examples of the present disclosure.

Disclosed in some examples are methods, systems, devices, and associated operations and functionality that enable location tracking of wireless network clients, through the use of coordinated network service and client operations. The location tracking techniques discussed herein may be applicable to perform a variety of location-based services and communication activities, including but not limited to the use of location tracking and identification with emergency call services.

In an example, network service and client scenarios are disclosed which involve devices that report MAC (Media Access Control) addresses of connected or nearby access points (APs) to a network infrastructure service. The network infrastructure service maintains a list of MAC addresses or other access point identifiers, which are used to validate and authenticate the reported APs. When identifying a newly reported AP, the network infrastructure service operates to determine, assign, and track a location to the newly reported AP, based on a known location of the VoIP client that reported the new AP, based on proximity of the VoIP client to other known APs, based on a response from a network administrator which provides the location, or based on other dynamic or real-time factors. The network infrastructure service may also utilize this list of MAC addresses or identifiers to validate the reliability or validity of the newly reported AP, and implement aspects of network selection, validation, and fraud prevention.

In further examples, the list of MAC addresses or other identifiers may be provided or maintained in a whitelist. This white list, maintained and synchronized between the network service and the client, may define a list of registered (e.g., tracked, validated, trusted) APs for network connectivity or network services. The use of a white list may involve both client and server coordination, such as by having MAC addresses that are pushed to respective clients become white-listed or distributed based on a specific user, account, service, device, or the like. The location tracking and provisioning techniques may also be extended so that if a new AP is verified (e.g., by an IT administrator), the new AP may be automatically added and provisioned in a white list for a user or a group. Additionally, the location tracking and provisionimg techniques may also enable the device to become aware of its location when connected with or in range of a particular AR As a result, if the client conducts a subsequent communication session, such as with an emergency call service, the client can provide this location to the service.

Use of the present techniques may provide a number of improvements and efficiencies in network operations and location services. First, the techniques enable an AP or wireless network to be quickly associated with a particular location (or area encompassing the location) on the basis of what other nearby APs have been detected. Second, the techniques enable an AP or wireless network to be easily verified and associated with a location by actions of a network administrator, such as in response to use of a newly deployed AP, moved or reconfigured AP, or other settings where location or service configurations were overlooked or incomplete. Third, the techniques improve both client-side and network service-side security, to prevent clients from using rogue or unauthorized APs and wireless networks.

The present disclosure thus addresses issues with computer networking in which the location of access points and clients associated with such access points are unknown, not updated, or are inaccurate. The present techniques provide technical solutions and benefits that are applicable for location-based services, networking services and systems, network administration services and systems, and client devices. The disclosed techniques improve the functioning of the computer system by enabling use of additional services and may be accompanied by security and communication functionality improvements for both network and client software. These and other benefits will be apparent from the following examples and illustrations.

FIG. 1 illustrates an example deployment 100 of access points for communication operations, according to some examples of the present disclosure. Computing device 110, shown as a cellular telephone, and computing device 130, shown as a notebook computer, are portable computing devices capable of operating at different locations. Specifically, devices 110, 130 may be moved among different locations of a corporate, personal, or other network deployment provided by various network access points 116, such as APs 116-A, 116-B, 116-C, 116-D, 116-E, 116-F.

In an example, the network APs 116 operate according to Institute for Electrical and Electronics Engineers (IEEE) 802.11 (Wi-Fi) protocol specifications, and broadcast access point information for discovery and connectivity by clients. This access point information may be provided in a respective beacon frame, and include a Media Access Control (MAC) address, and/or a Service Set identifier (SSID) of the network. In other examples, the access point information may be provided in other control channels and messages, such as specified via 802.11 action frames, or channel measurements such as specified by 802.11k radio resource measurements. Other data fields or messages may also be communicated, broadcast, or provided, in accordance with the parameters of the employed network protocol and standard.

In an example, the computing devices 110, 130 are provisioned with a white list of access points (e.g., access points that the device is permitted to connect to, or use, to perform some operation). This white list may be provided to the devices 110, 130 as a result of network configuration (e.g., by joining a network domain), or provided as a result of use or association with a service, such as a network communications service 120. In a further example, the white list may be maintained and distributed to the computing devices by the network communications service 120 when the computing devices 110, 130 respectively join, register, or authenticate with the network communications service 120.

The network communication service 120 provides voice, video, or other communication functionality with other devices and users as part of a Voice-over-IP (VoIP) calling service. In a further example scenario, discussed in more detail in FIG. 2, the VoIP calling service implemented by the network communications service 120 includes functionality to perform calls with conventional telephone services, including emergency calling services.

Additionally, as shown in limited detail in FIG. 1, other devices or components may be used to relay or extend communications to other devices and device components. For example, a peripheral headset 132 (e.g., a wired or Bluetooth wireless headset) may be used to exchange audio of a communication session (e.g., a call) between a human user (not shown) and the computing device 130. However, it will be understood that the techniques discussed herein are not limited to a particular form factor of the devices 110, 130 or any peripheral or software client used with the devices 110, 130. Likewise, the techniques discussed herein are not limited to phone or voice calls but may extend to a variety of types and forms of communications.

The computing device 110, 130 may scan for beacons broadcast by the access points 116. The computing device 110, 130 may then connect to a respective access point through an association and authentication process (e.g., as outlined by the IEEE 802.11 family of standards). After connecting to the access point, software on the computing device 110, 130 may temporarily restrict network access to some applications or services on the computing device 110, 130. The computing device 110, 130 may establish an encrypted tunnel and send an access point report with scan results, to the network communications service 120. The scan results may include access point information (e.g., MAC addresses) corresponding to any of the access points 116 and may include a listing of APs currently in range. The scan results may be communicated to the network communication service 120 when logging into the service, when performing an action (such as initiating a certain type of call) with the service, at various time intervals, etc.

In farther examples, the access point information may include a geolocation (e.g., geographic coordinates or identifier) of the computing devices 110, 130 and/or measurements of a radio signal from the access points, if known and available. The network communications service 120 may utilize the information provided by the computing devices 110, 130, to associate the respective devices with observed location of the access points in the report. The network communications service 120 may utilize the information provided by the computing devices 110, 130 to associate the device with tracked locations of the APs 116, including to establish, update, or verify the location and operational status of a particular AP or a particular device (or sets of APs or sets of devices) This information may be combined or considered in addition to AP or device location information already maintained by or available to the network communications service 120.

The network communications service 120 may store and track a plurality of locations of computing devices and access points. The network communications service 120 may perform this tracking as part of a white list maintenance service, which maintains user-based or device-based white lists to track locations and validation status of various APs, networks, and network services.

In addition to access point information directly provided from the devices 110, 130, the network communications service 120 may utilize stored one or more other previously received reports and information from other computing devices, other access points, an administrator, or other location services, to calculate a location of the access points 116. This information may include observed measurements of wireless network signals taken by a computing device (e.g., a received signal strength indicator (RSSI), a round time, a time of flight measurement, or the like). For instance, using such measurements, the network communications service 120 may compute a distance between the respective computing device and each observed access point, or an estimate of the proximity of an access point to existing known access points. Using additional reports from additional computing devices, or changed network conditions, the network communications service 120 may employ a trilateration or other location refinement algorithm to calculate or refine an observed position of the access points.

As an operational example, suppose that computing device 110 includes an AP white list which allows the device 110 to connect to APs 116-B, 116-C, 116-D. When the computing device 110 is in proximity to the AP 116-A, the device 110 will determine from the white list that it is not allowed to connect to the AP 116-A. Or, if the computing device 110 is allowed to connect to the AP 116-A, the device 110 will determine that it cannot perform some action or service via the AP 116-A. In response, the computing device 110 contacts the network communication service 120 to validate the use of the AP 116-A, and to provide the network communications service 120 with access point information regarding the AP 116-A and other visible APs (e.g., APs 116-B, 116-C, 116-D). The network communications service 120 requests that an administrator (not shown) validate the use of the AP 116-A for the requested connectivity or service. Upon approval, the network communications service 120 updates a white list at the network communications service 120 and/or at the device 110, which enables the device 110 to connect to or use a service with the AP 116-A.

Also, as an operational example, a geographic location associated with a new AP may be associated or correlated with a geographic location known for other existing known APs, Suppose that computing device 130 connects to AP 116-E, located at latitude E and longitude E, and the AP 116-1E is not yet included on a white list. The computing device 130 reports the access point information of multiple nearby access points, including information for AP 116-E in addition to information for AP 116-F. The network communications service 120 maintains geographic tracking information for AP 116-F, associating the AP with latitude F and longitude D. The network communications service 120 may derive an approximation of the location of AP 116-E here, by identifying that the maximum range 122 of the AP 116-F extends to latitude D, but the maximum range 124 of the AP 116-E does not extend to the location of AP 116-F at latitude F; thus, the range of AP 116-E must end between latitude F and latitude D. Other network location calculation techniques involving the devices 110, 130, the APs 116, and other equipment are also usable with the present techniques.

In further examples, other computing devices within a predetermined proximity to a subject computing device may also be identified as located within the same cluster or group. For instance, in a corporate building setting, where a large number of devices and access points are located and concurrently operating, fewer measurements from devices and APs may be needed to calculate a position of the access points. Additionally, the location information that is derived from administrator and network configurations (e.g., devices on the same domain or network) may also assist the identification of devices within a cluster or group.

The network communications service 120, in further examples, may include or coordinate with aspects of a fraud detection service. For example, the fraud detection service may conclude that the position of AP 116-A at latitude F and longitude D is not consistent with a previously recorded position, or that a device at a location which sees APs 116-A and 116-C is not expected to see AP 116-F. In such cases, an access point which is not operating with expected characteristics may be labeled as potentially anomalous, and information may be communicated to an administrator to determine remedial actions, including, removal from a white list, addition to a black list (prohibited list) or gray list (a list requiring verification), notification to an administrator, or other actions.

Further, a fraud detection service operating at the network communications service may utilize access point information and related signal or location measurements to determine what other access points should be visible to the computing device based upon the access point positioning data. Accordingly, a position of the computing devices 110, 130 may be ascertained from the measurements and the known positions of the access points 116 from all or portions the access point positioning data, including positioning data collected over a period of time. In other examples, the fraud detection service may use only the observable access point information communicated by the computing device.

Additionally, the access point information collected bye the computing devices 110, 130 may provide positioning data for use in a model that, when given a list of one or more visible access points, outputs a probability that another given list of one or more access points would be visible. For instance, the computing device may calculate the probabilities of each visible access point given all other visible access points. This model may be created based upon a access point information collected over time from a plurality of other computing devices. Other variations to fraud detection, location identification, and access point verification may also be used in combination with the location identification techniques discussed herein.

In another example, the present location tracking techniques may be used with cellular base stations, repeaters, and other cellular network equipment stations. For instance, various types of microcell stations, picocell stations, or home repeaters may be deployed in various geographic areas in the same manner as the Wi-Fi access points indicated in FIG. 1. Accordingly, the references herein to "access points" may refer to cellular network stations, and "access point information" may refer to information obtained from cellular network stations, such as in networks operating in accordance with a 3G, 4G/LTE, or 5G specification. With such cellular network deployments, the access point information may include base station identifying information that is communicated on a broadcast or control channels (e.g., FACCH (Fast Associated Control Channel), or SACCH (Slow Associated Control Channel)).

Figure 2:
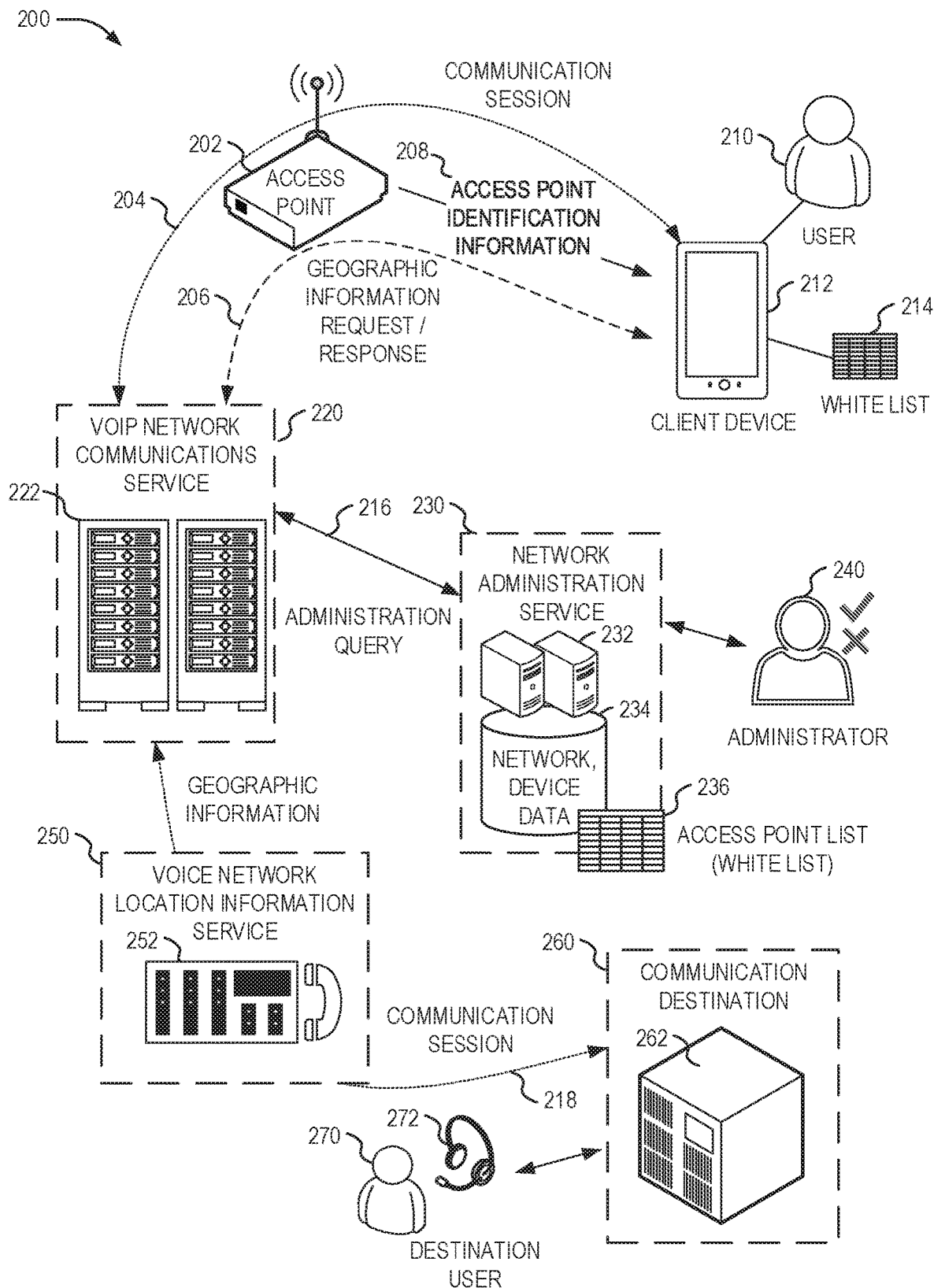
FIG. 2 depicts an example sequence of access point location tracking performed with a communication session, according to various examples of the present disclosure.

Turning now to FIG. 2, an example sequence 200 of access point location tracking is illustrated, performed with a communication session according to various examples of the present disclosure. The operations of the sequence 200 may be performed by aspects of a client device 212, an access point 202, a VoIP network communications service 220, a network administration service 230, a voice network location information service 250, and other services and functionality discussed herein.

At operation 208, a set of network access points visible to a client device 212 may be determined, as the client device 212 receives and parses identification information from one or more access points. For example, the client device 212 may scan one or more frequencies for beacon or other broadcast frames that advertise access points (e.g., the AP 202). These beacon frames may include an access point identifier or information such as a Service Set Identifier (SSID), a MAC address of the access point, and the like. In some examples, in addition to scanning one or more channels for one or more access points, the client device 212 measures a metric corresponding to the channel that is indicative of a distance between the computing device and the access point. For example, such metric may include a received signal strength, a round trip time, a time of flight measurement, or the like.

The client device 212 is adapted to host a white list 214 used for determining connectivity or capabilities of a particular AP. The white list 214 may also include a list of known geographic locations as determined by the network communications service 220 or another entity. Also in an example, the client device 212 may determine whether to perform a geographic information operation 206, to request geographic information of the AP based on information available or maintained in the white list, such as time/date information that may indicate the geographic information is outdated.

With the geographic information operation 206, the client device 212 provides a geographic information request to the VoIP network communications service 220. This information request may be performed in connection with joining or authenticating with a communications service, attempting to conduct a call, at regular intervals, etc. In an example, the geographic information request is performed using connectivity via the AP 202. However, another access point (or, another network connection or topology, such as a 3G/4G/5G wide area network connection) may be employed. The operation 206 concludes with a geographic information response being returned to the client device 212 from the VoIP network communications service 220. This geographic information response may include an indication of a specific geographic location of the AP 202 or the wireless network, such as GPS coordinates, street address, building identifier, etc.

The operations used to generate the geographic information response, and to determine missing geographic information, are further depicted in FIG. 2. For instance, if the VoIP network communications service 220 does not have geographic information for the AP 202, and is unable to determine this information from the access point identification information, then further information may be obtained from an external source or entity. This may include the use of an administration query to a network administration service 230, in administration query operation 216.

The network administration service 230 may operate a server platform 232 maintaining network and device data 234 for various devices and entities within a network managed by administrator 240. For instance, the administrator 240 may define an access point list 236 which serves as a white list for an organization or company, and which includes or is associated with administrator-known/maintained location information. Further, if the location information for a particular AP is not known or maintained, the administrator 240 may be queried to supply the location information. Other uses of external data services and location services to identify the location of the client device 212 and the AP 202 may also be employed with the use of the network administration service 230.

Based on the geographic information operation 206, a communication session 204 may be established. This may include use of the VoIP network communications service 220 to establish a call with location service capabilities. This call is shown with use of communication session 218, and the call is established between the network equipment 222 of the VoIP network communications service 220 and the network equipment 262 of the communication destination 260.

In an example, the communication session 204 facilitates an emergency call, or a like call that involves the use of a voice network location information service 250. For example, the voice network location information service 250 may include processing equipment 252 which collects or processes location information, such as in an "enhanced 911" setting. In an example, geographic information established for the AP 202 by the VoIP network communications service 220 is communicated to the voice network location information service 250 and the communication destination 260 in communication session 218. This communication session 218 may be used to facilitate the call to exchange voice, video, data, or other information between the user 210 of client device 212, and a destination user 270 of the network equipment 262 (including, via use of communication peripheral equipment 272). While FIG. 2 and other examples herein describe the use of a geolocation determined by the methods herein in the context of a voice call, the geolocation may also be utilized in other types of data applications and location services.

Figure 3:
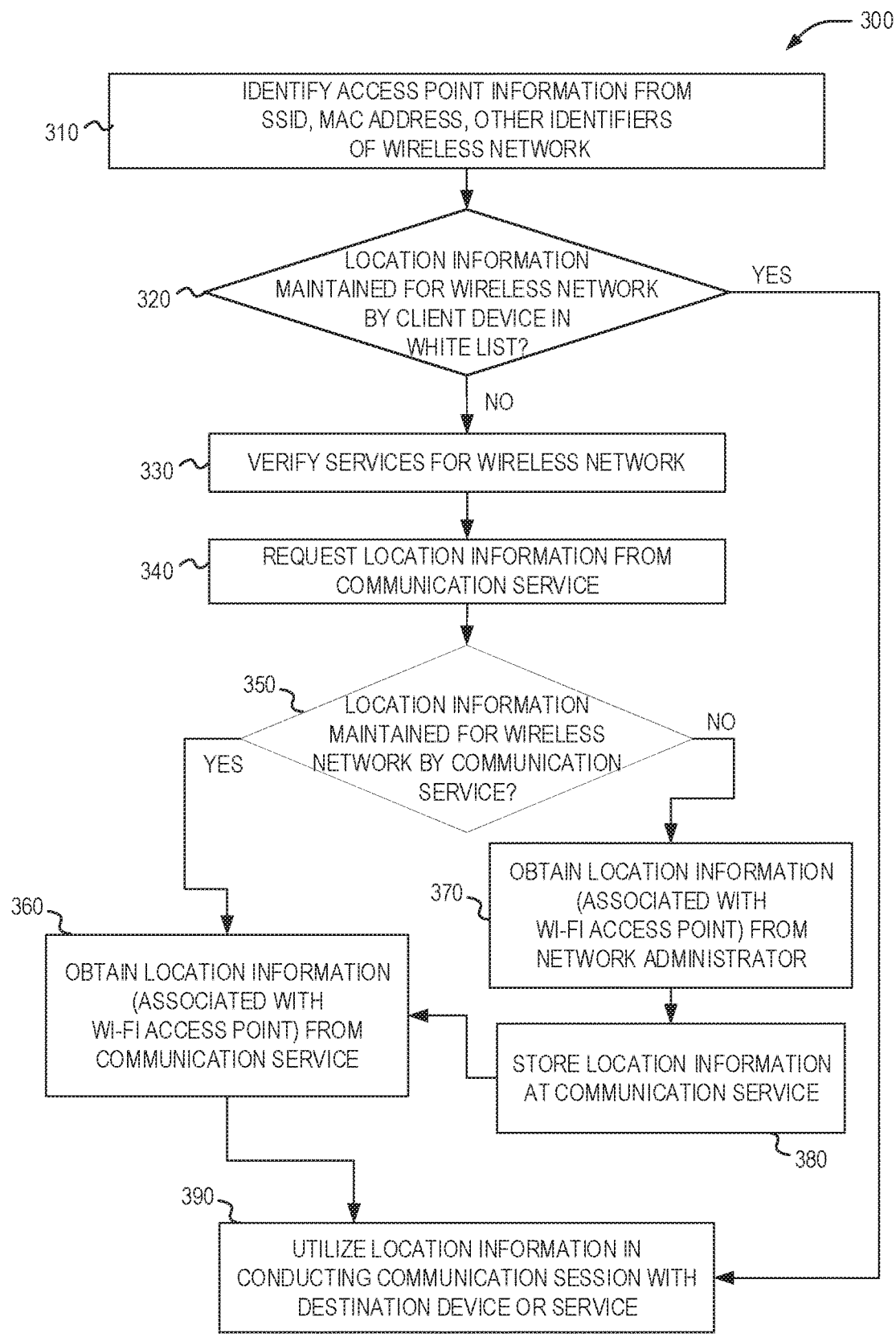
FIGS. 3-4 depict flowcharts of methods performed by a client device for access point location tracking, according to various examples of the present disclosure.
Figure 4:
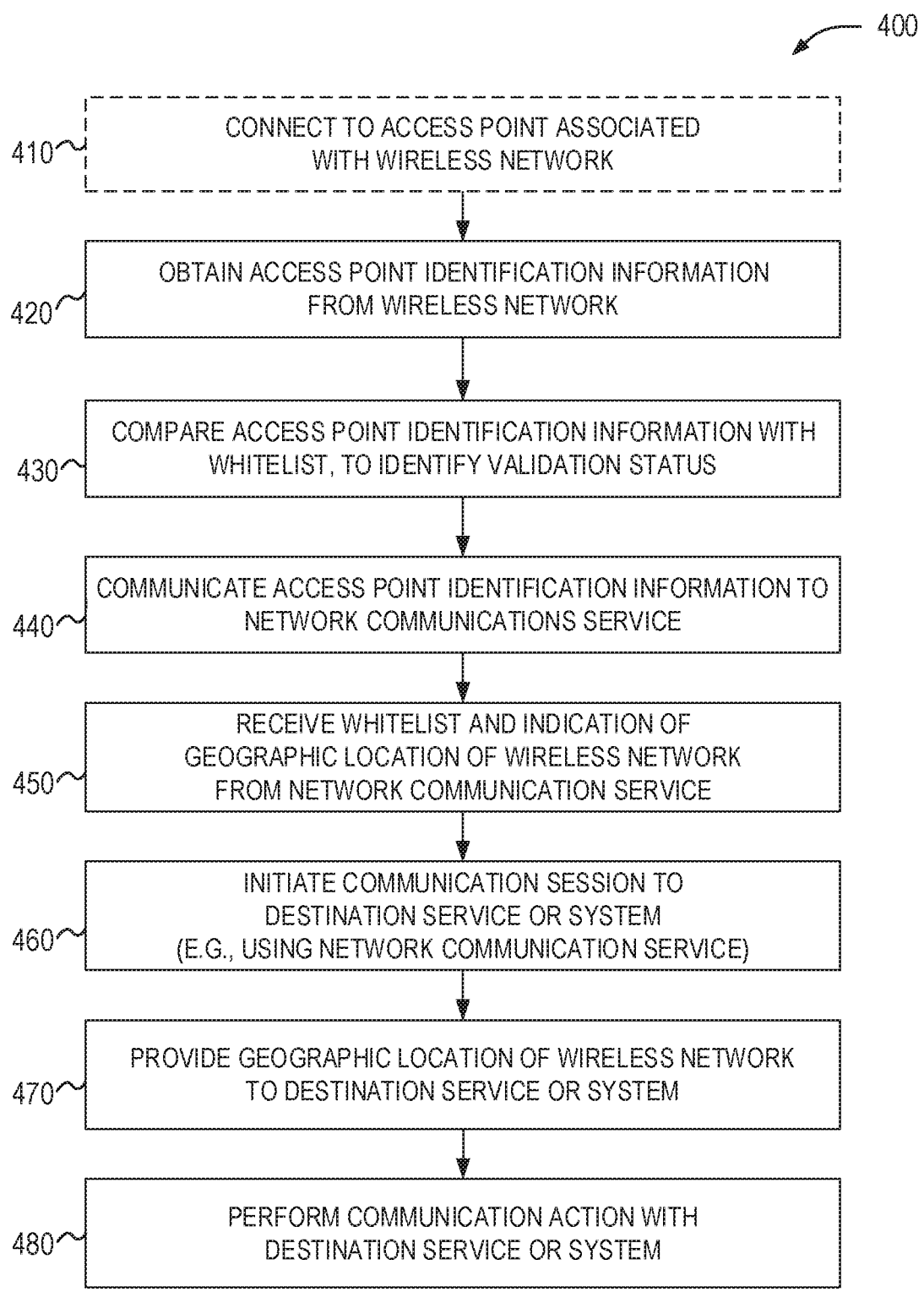
Figure 5:
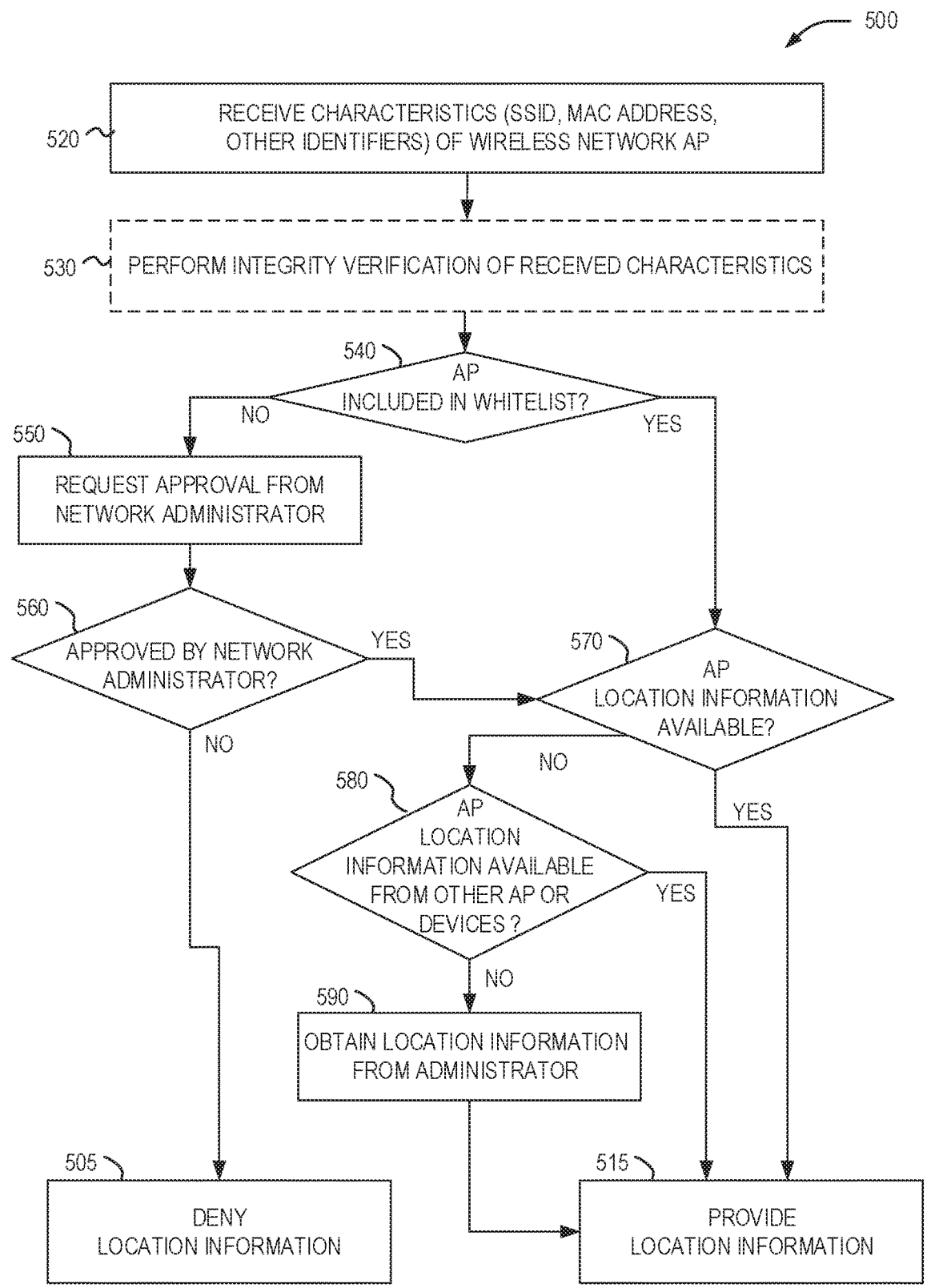
FIGS. 5-6 depict flowcharts of methods performed by an infrastructure service for access point location tracking, according to various examples of the present disclosure.

FIGS. 3-6 describe additional methods for performing the operations depicted in FIG. 2, from client-side perspectives (FIGS. 3 and 4) and communication server-side perspectives (FIGS. 4 and 5). Each of the methods of FIGS. 3-6 may adapt to different amounts of information available within the overall system, such as different types of access point positioning data and whether measurement and/or computing device locations are available. It will be understood, however, that different client and server run-time scenarios may involve the different combinations of the depicted operations.

FIGS. 3-4 specifically depict flowcharts of example methods performed by a client device for access point location tracking. As shown, the flowchart 300 of FIG. 3 commences with a client device, in operation 310, identifying access point information from a particular wireless network (or, from available wireless networks in reception range). For instance, this access point information may comprise an SSID, a MAC address, or another identifier of the access point(s) within wireless range. Using this access point information, the client device performs, in determination 320, an evaluation of whether the location information for a particular wireless network (and access point) is maintained by the client device in a white list. If the location information is available, the flowchart 300 progresses to utilizing the location information in a communication session with a destination device or service, in operation 390.

If the location information is not available, then further processing is performed in the flowchart 300 as follows. The client device continues to verify one or more services for the wireless network, in operation 330, such as whether permissions are available to utilize a particular network service. The client device also continues to request location information of the wireless network or access point, in operation 340, from a communication service.

A further evaluation, in determination 350, is performed by the client device (and, potentially, the communication service), to identify whether location information is maintained for the wireless network or access point by the communication service. If this location information is already maintained and available at the communication service (e.g., in a communication service white list), then the client device obtains the location information associated with the access point, in operation 360. The flowchart 300 then concludes with the client device utilizing the location information to conduct a communication session with a destination device or service, in operation 390. If this location information is not maintained or not available at the communication service (e.g., is not stored or tracked by a communication service white list), then operations are performed to obtain the location information from a network administrator or a network administrator service, in operation 370. This location information is then stored at the communication service, in operation 380, such as in the white list. The operations of the flowchart then conclude with operations 360, 390 to communicate the location information to the client device and utilize the location information.

FIG. 4 provides a sequential list of operations used for determining access point geographic locations, from a perspective of a client device. The flowchart 400 of FIG. 4 commences with an optional operation of connecting to an access point associated with a wireless network, in operation 410. In an example, the access point is used for initial network connectivity (e.g., internet connectivity) to access a network communications service (e.g., a VOIP service) which provides an access point geographic location and validation status for the access point and wireless network. However, some of the following operations may occur using a connection to another wireless network (e.g., a secondary network, public network, wide area network, etc), and subsequently connecting to the access point associated with the wireless network after receiving a geographic location and a validated status (e.g., after operation 440, discussed below).

The operations of the flowchart 400 continue by receiving or otherwise obtaining the access point identification information from the wireless network, in operation 420. This identification information identifies the access point of the wireless network, and may include a SSID, MAC address, or other identifier of the access point. In further examples, the MAC address is received as an encrypted value. Also in further examples, the access point identification information includes a certificate issued for the wireless network. In various examples, the wireless network operates in accordance with an IEEE 802.11 standard; whereas in other examples, the access point is a cellular network station operating according to a cellular network standard, and the access point identification information includes identifier information for the cellular network station.

The flowchart 400 continues with the comparison of the access point identification information with information stored at a device white list, in operation 430. In an example, this comparison results in identifying an unvalidated status of the access point of the wireless network, from a white list maintained at the device (e.g., stored in a memory of the device) that includes identification information of at least one validated access point. In further examples, the white list is synchronized with and updated from the network communication service, including in an on-demand fashion when a particular communication service or unknown access point/wireless network is attempted to be used. Other forms of black lists, gray lists, and permission lists for services, networks, or individual access points may also be utilized and maintained (e.g., synchronized) at the device. In a further example, comparing the access point identification information with the white list, is performed by evaluating at least one characteristic of the wireless network with at least one characteristic stored in the white list. This at least one characteristic stored in the white list may relate to at least one of: identifiers of wireless networks operating in proximity to the wireless network; a number of wireless networks operating in proximity to the wireless network; service information associated with the access point; vendor information associated with the access point; or location information associated with the access point.

The flowchart 400 continues with the communication of the access point information to the network communication service, in operation 440; and the receipt of a white list (or an update to a white list) and an indication of a geographic location of the wireless network from the network communication service, in operation 450. The indication of the geographic location may also be accompanied by a validated status for the wireless network, the access point, a particular service, or the like. Based on this received information, the white list at the client device may be updated to include at least one identifier of the access point of the wireless network (and any accompanying service, network, or information status, such as a validation status).

In an example, the network communications service maintains a mapping of the access point identification information to a geographic identifier. For instance, the indication of the geographic location that is communicated to the client may include a specific geographic identifier; also for instance, the geographic identifier may include at least one of: global positioning system (GPS) coordinates, a street address, or a building identifier. In still further examples, the indication of the geographic location includes information that is obtained from an administrator associated with the wireless network. Accordingly, the indication of the geographic location (e.g., the geolocation of the access point, and thus, the device connected to the wireless network via the access point) may be provided to the device by the network communications service, in response to a determination by the network communication service that the access point identification information is associated with a defined geographic location.

The flowchart 400 continues with operations to initiate, or otherwise perform, a communication action in the network communication service, using the wireless network, in operation 460. This communication action may occur in response to receiving the indication of the validated status and the indication of the geographic location. This is followed by further operations, conducted as part of the communication action, to provide the geographic location for the wireless network from the device to a communication destination (a destination service, device, or system), in operation 470.

The operations of flowchart 400 conclude by performing a communication action with a destination service, device, or system, in operation 480. In an example, the communication action includes performing a voice over IP (VOW) call, based on a communication session facilitated for the device using the network communications service. In a further example, the communication destination is an emergency calling service. For instance, the communication session may enable an emergency call between the device and the emergency calling service, as the communication session is used to associate the emergency call with the geographic location for the wireless network.

Figure 6:
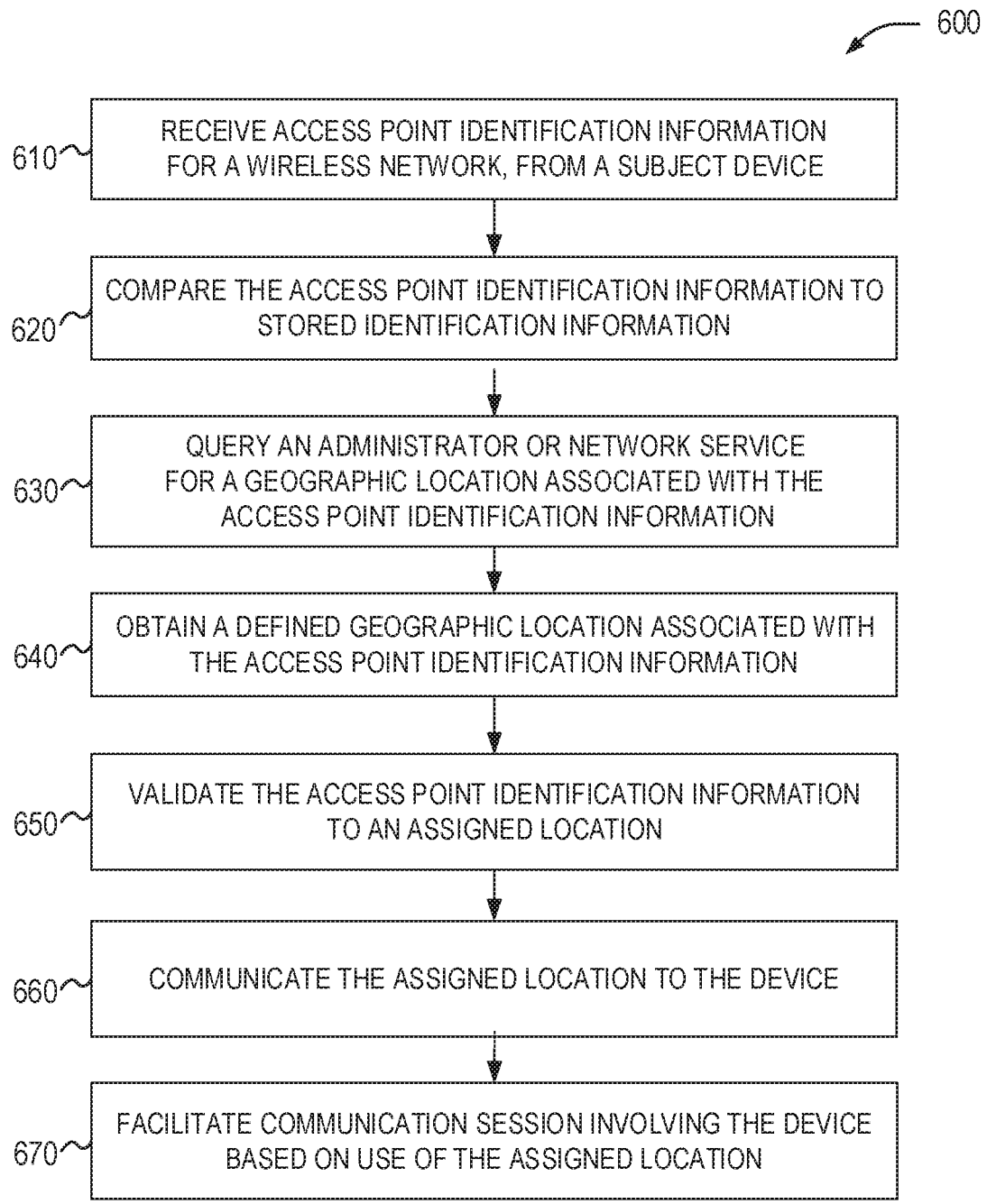

FIGS. 5-6 also depict flowcharts of example methods performed by an infrastructure service for access point location tracking. As shown, the flowchart 500 of FIG. 5 commences with a service (or server-side) device, in operation 520, receiving access point information and other characteristics of a particular wireless network or particular access point from a client device. Again, this access point information may include a SSID, a MAC address, or another identifier of one or more access points. In optional examples, the server performs fraud verification of received access point characteristics, at operation 530, using this access point information. For instance, the integrity verification may determine whether the SSID or MAC address is being spoofed, whether the access point is in a correct operational state, or other aspects of verification and validation.

The flowchart 500 continues with a determination, in evaluation 540, which identities whether the wireless network AP is included in a white list maintained by the service. If the wireless network AP is not included in the white list, then approval for the wireless network AP is requested from a network administrator, in operation 550. This leads to a further determination, in evaluation 560, based on whether the wireless network AP is approved for use by the administrator. If not approved, then location information for the device and AP is denied, in operation 505.

If, however, the wireless network AP is included in the white list or is approved by the network administrator for inclusion in the white list, then the flowchart 500 continues with a determination of whether AP location information is available, in evaluation 570. If the AP location is not available (or is outdated or restricted), then a further determination is performed in evaluation 580, on whether the location is available from other APs or devices, in evaluation 580. As a result, if the AP location information is available, such location information may be included in the white list and provided to a client device, in operation 515. If the AP location is not available, then the location information is obtained from the administrator, in operation 590.

FIG. 6 includes a flowchart with a sequential list of operations used for determining access point geographic locations, from a perspective of an infrastructure service. The flowchart 600 of FIG. 6 commences with operations of receiving access point identification information for a wireless network, via a subject device, in operation 610. This is followed by comparing the access point identification information to stored identification information, in operation 620. In an example, the access point identification information includes a SSID or a MAC address of the access point, as the wireless network operates in accordance with an IEEE 802.11 standard.

The flowchart 600 of FIG. 6 continues by querying an administrator or network service for a geographic location associated with the access point identification information, in operation 630. From this information, the service obtains a defined geographic location associated with the access point identification information, as in operation 640. The access point identification information is then validated to an assigned location, in operation 650.

The flowchart 600 of FIG. 6 concludes by communicating the assigned location to the device, in operation 660, and facilitating a communication session involving the device, based on use of the assigned location, in operation 670. In an example, the communication session with the device is initiated in response to verification of the assigned location by the device. In an example, the access point identification information identifies the access point of the wireless network to which the device is already connected, whereas in another example, the access point identification information identifying the access point of the wireless network to which the device will attempt to connect. Accordingly, the techniques of flowchart 600 may be implemented in both current and prospective connection settings.

Figure 7:
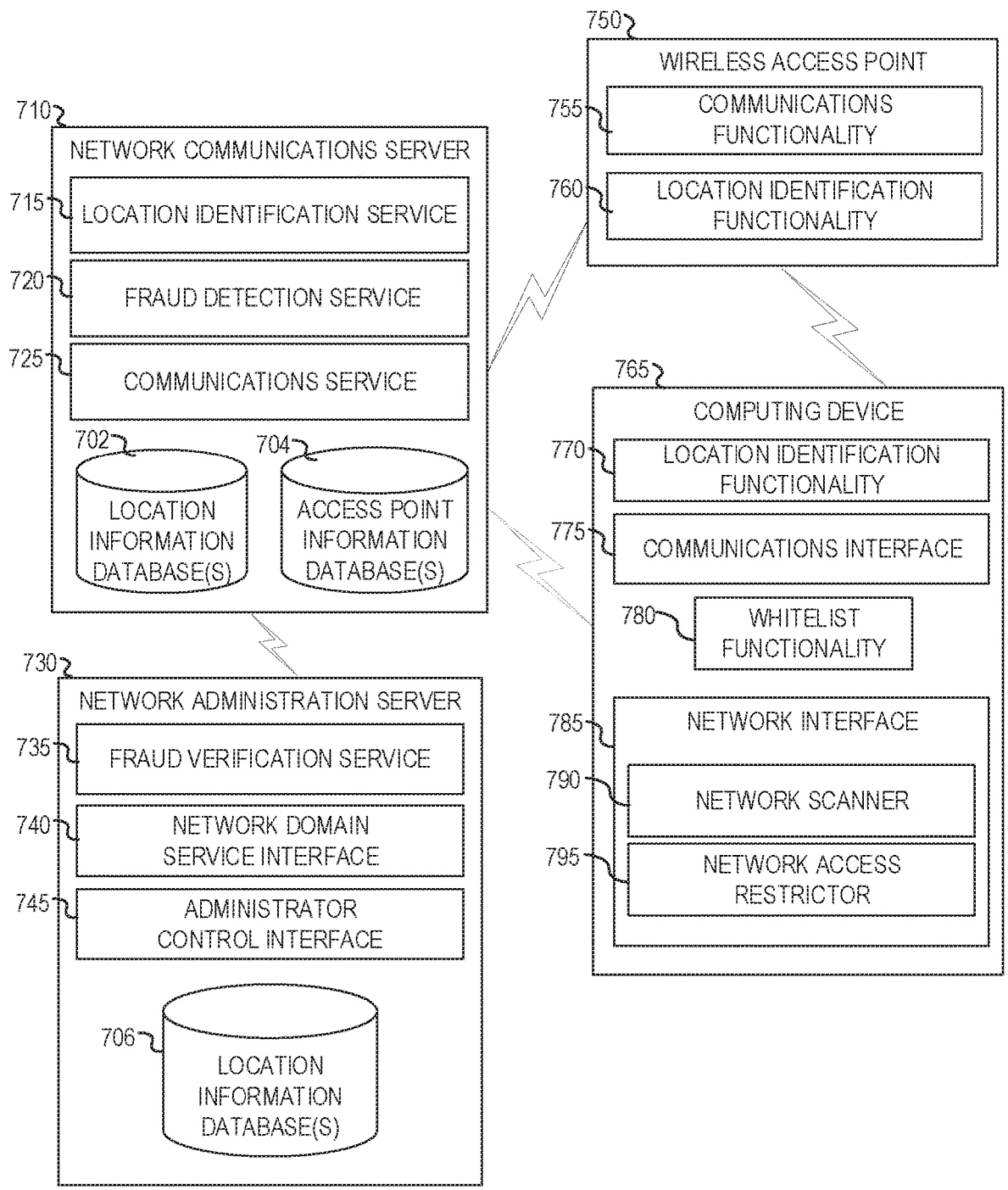
FIG. 7 illustrates a schematic of operational and functional components used among client and service platforms with the present location tracking techniques, according to various examples of the present disclosure.

FIG. 7 illustrates a schematic of operational and functional components used among client and service platforms with the present location tracking techniques. These components include a network communications server 710, a network administration server 730, a wireless access point 750, a computing device 765, and various sub-components that are included or associated with the location tracking techniques. The network communications server 710 may be an example of a server that implements any of the services 120, 220, 230, 250. The computing device 765 may be an example of computing device 110 and 130. The wireless access point 750 may be an example of the APs 116. The network administration server 730 may be an example of a server that implements the services 230.

The components shown in FIG. 7 may be embodied or implemented in hardware, software, or any combination thereof. The functionality of each component is one example arrangement of functionality and one of ordinary skill with the benefit of the present disclosure will appreciate that other organizations are possible. For example, one or more of the functions of one or more service components of the network communications server 710 may be performed by one or more of the other components. Likewise, one or more of the functions of one or more components of the computing device 765 may be performed by one or more of the other components.

Computing device 765 may include a communications interface 775 such as VoIP software or hardware (e.g., audio processing hardware, video conferencing software) used to perform (e.g., receive inputs, provide outputs) calls, chats, or other aspects of human-to-human or human-to-machine communications. The computing device 765 may also include a network interface 785. The network interface 785 may provide one or more software and/or hardware components to enable the computing device to associate, authenticate, and connect to a wireless access point. This includes network stacks, such as Transmission Control Protocol (TCP), Internet Protocol, one or more protocol layers specified by an 802.11 family of standards promulgated by the Institute for Electrical and Electronics Engineers (IEEE), and the like. As used herein, access points and computing devices may communicate, authenticate, associate, connect and otherwise operate according to an IEEE 802.11 family of standards, such as 802.11n or 802.11ac. The computing device 765 may also include other network interfaces for communicating via other types of wired or wireless networks.

The computing device 765 may also include white list functionality 780 used to identify one or more access points that the computing device is authorized to connect with or conduct certain services with. The white list may be a list of access points in a particular network or deployment location, such as a corporate network or building. In some examples, the network interface 785 may limit the scan for access point beacon frames of access points identified in the white list functionality 780. The white list functionality 780 may identify access points by an access point identifier that may comprise one or more of: an SSID, a MAC address, or the like.

For instance, network scanner functionality 790 of the network interface 785 may scan for one or more access points, by listening at designated frequencies and according to designated protocols such as an 802.11 protocol for beacon frames sent by access points. In various examples, the network scanner functionality 790 may disregard access points that are not in the white list based upon the identification of the access point in the white list. Also in some examples, the network scanner functionality 790 may perform one or more measurements of the radio interface between the access points that are scanned and the computing device. For example, such measurements may include a received signal strength (which may be described by RSSI), a round-trip time, and the like. In some examples, the network scanner functionality 790 may associate and/or authenticate with one or more access points to perform the measurements.

To control the connection or use of the computing device 765 with an access point, the network access restrictor 795 may restrict the network access of the computing device 765 (for all connectivity or for a particular service or protocol)

until the subject access point has been added or authorized to a white list by the white list functionality 780.

The computing device 765 includes location identification functionality 770 which may be used in some examples to determine location from other sources. For example, this location identification functionality 770 may include a global positioning system (GPS) sensor, address lookup table, or other operable components related to location. In other examples, relevant location identification operations are performed by the access point or network communications server (as discussed below).

The wireless access point 750 is depicted in FIG. 7 as including communications functionality 755 and location identification functionality 760. The communications functionality 755 may facilitate respective connections with client devices (such as computing device 765) and the establishment of local and wide area network capabilities, such as using an IEEE 802.11 protocol. In an example, the location identification functionality 760 may include limited capabilities that enable the AP to become self-aware of aspects of its own location.

The network communications server 710 is depicted in FIG. 7 as including a location identification service 715, a fraud detection service 720, and a communications service 725, operating in connection with a location information database 702 and an access point information database 704. For instance, the communications service 725 may enable use of voice, video, or other telecommunication services. The fraud detection service 720 may detect improper credentials or characteristics of access points or devices for connectivity, based on the location information database 702 and the access point information database 704. The location identification service 715 may include functionality to identify an approximate or estimated location of the wireless access point 750 or the computing device 765 through derived location information on nearby access points, devices, landmarks, network infrastructure, or measurements, including those maintained by the location information database 702 and the access point information database 704.

Finally, the network administration server 730 is depicted in FIG. 7 as including a fraud verification service, a network domain service interface 740, and an administrator control interface 745, operating with use of a location information database 706. The fraud verification service 735 may enable an administrator to verify access point information, including location information or identifiers, using a white list or predefined administration information or as stored in a location information database 706. The network domain service interface 740 may operate to define network operational domains and services via the wireless access point 750 or sets of access points. The administrator control interface 745 may receive location information and control parameters for devices, access points, and the network domain, consistent with the administrator functionality discussed above.

Figure 8:
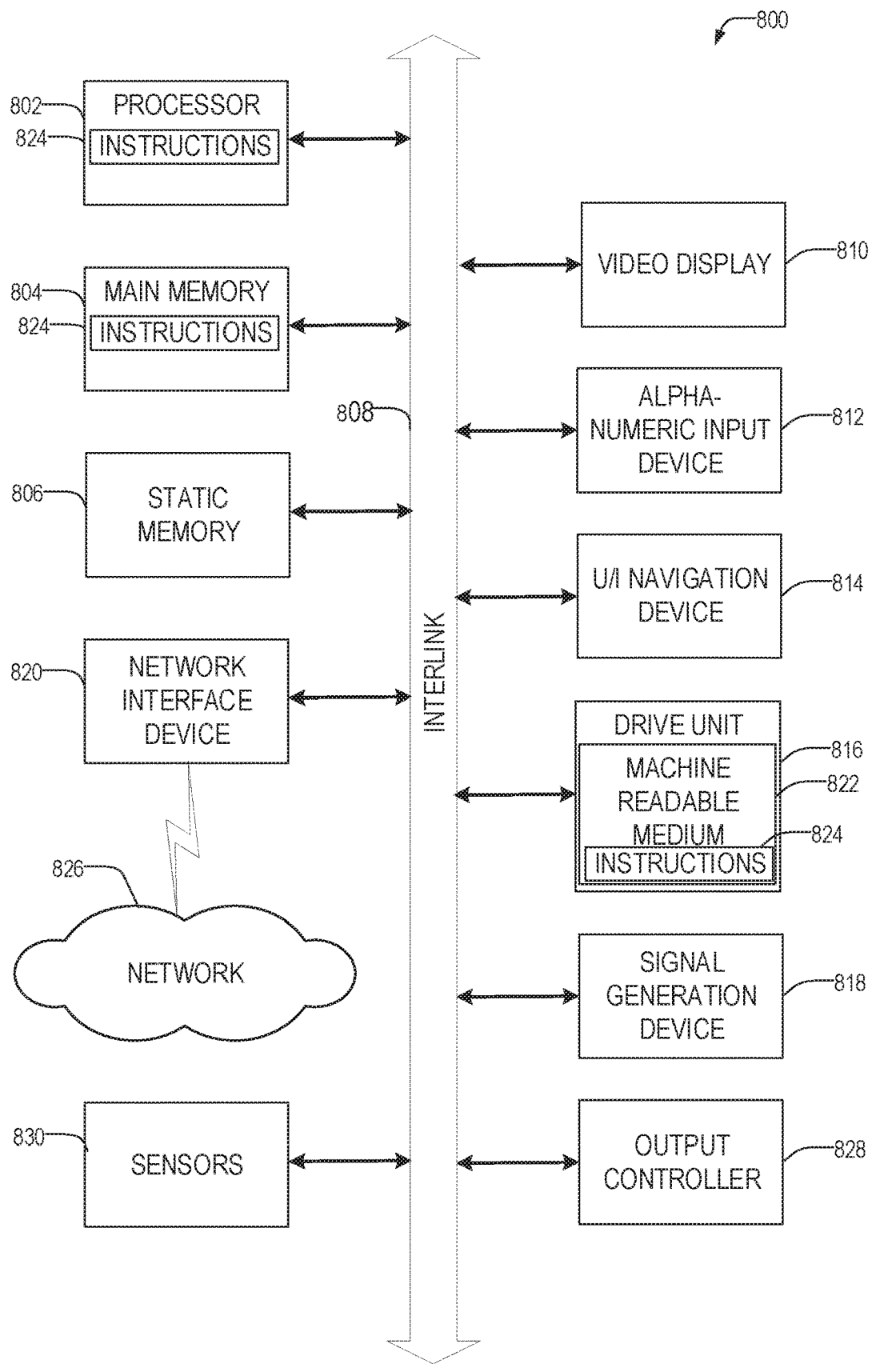
FIG. 8 is a block diagram illustrating an example of a machine upon which one or more embodiments may be implemented.

FIG. 8 illustrates a block diagram of an example machine 800 upon which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a computing device such as a personal computer (PC), a tablet PC, a personal digital assistant (PDA), a mobile telephone, a cloud-based or networked server, a virtualized server, a smart phone, a web appliance, a network router, an access point, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. Machine 800 specifically may implement the devices and platforms 110, 120, 120, 212, 222, 232, 252, 262 of FIGS. 1 and 2, the operations provided by the methods of FIGS. 3-6, or any of the servers and devices 710, 730, 750, 765, as referenced in FIG. 7.

Examples, as described herein, may include, or may operate on, logic or a number of components, modules, or mechanisms (hereinafter "components"). Such components are tangible entities (e.g., hardware) capable of performing specified operations and may be configured or arranged in a certain manner. In an example, circuits or circuitry may be arranged (e.g., internally or with respect to external entities such as other circuits or circuitry) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations, in an example, the software may reside on a machine readable medium, such as a non-transitory machine-readable storage medium. In an example, the software, when executed by the underlying hardware of the component, causes the hardware to perform the specified operations.

Accordingly, such a component encompasses a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which components are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular component at one instance of time and to constitute a different component at a different instance of time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 830, such as a global positioning system (GPS)

sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, a machine-readable medium may include a single medium or multiple media (e.g., a centralized or distributed database, and/or associated caches and servers) configured to store the one or more instructions 824. Thus, the term machine readable medium may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions.

Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices: magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media (e.g., excluding a transitory propagating signal).

The instructions 824 may further be transmitted or received over a communications network 826 using a transmission medium via the network interface device 820. The machine 800 may communicate with one or more other machines utilizing any one of a number of transfer protocols (e.g., frame relay, internet protocol (IP), transmission control protocol (TCP), user datagram protocol (UDP), hypertext transfer protocol (HTTP), etc). Example communication networks may include a local area network (LAN), a wide area network (WAN), a packet data network (e.g., the Internet), mobile telephone networks (e.g., cellular networks), Plain Old Telephone (POTS) networks, and wireless data networks, such as networks implementing the Institute of Electrical and Electronics Engineers (IEEE) 802.11 family of standards known as Wi-Fi®, a Long Term Evolution (LTE) family of standards, a Universal Mobile Telecommunications System (UMTS) family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to tirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is a device adapted for association and use of a geographic network location tracked by a network communications service, the device comprising, at least one hardware processor; communications circuitry adapted for receiving, in a wireless network, access point identification information that identifies an access point of the wireless network; and a memory, including instructions, which when executed, cause the hardware processor to perform operations comprising: comparing the access point identification information with a white list, to identity an (invalidated status of the access point of the wireless network, wherein the while list includes, identification information of at least one validated access point: communicating, to the network communications service, the access point identification information; receiving, from the network communications service, an indication of a validated status for the access point and an indication of a geographic location for the wireless network; and performing a communication action in the network communications service, using the wireless network, in response to receiving the indication of the validated status and the indication of the geographic location, wherein the communication action includes providing the geographic location for the wireless network from the device to a communication destination.

In Example 2, the subject matter of Example 1 includes, the wireless network operating in accordance with an IEEE 802.11 standard, wherein the access point identification information includes a MAC address of the access point.

In Example 3, the subject matter of Example 2 includes, the MAC address being received as an encrypted value.

In Example 4, the subject matter of Examples 1-3 includes, the access point identification information including a certificate issued for the wireless network.

In Example 5, the subject matter of Examples 1-4 includes, the access point being a cellular network station operating according to a cellular network standard, wherein the access point identification information comprises identifier information for the cellular network station.

In Example 6, the subject matter of Examples 1-5 includes, the white list being stored in the memory, with the operations further comprising: updating the white list, in response to receiving the indication of the validated status for the access point, wherein the white list is updated to include at least one identifier of the access point of the wireless network.

In Example 7, the subject matter of Examples 1-6 includes, comparing the access point identification information with the white list, performed by evaluating at least one characteristic of the wireless network with at least one characteristic stored in the white list, wherein the at least one characteristic stored in the white list relates to at least one of: identifiers of wireless networks operating in proximity to the wireless network; a number of wireless networks operating in proximity to the wireless network; service information associated with the access point; vendor information associated with the access point, or location information associated with the access point.

In Example 8, the subject matter of Examples 1-7 includes, the indication of the geographic location being provided by the network communications service, in response to a determination by the network communications service that the access point identification information is associated with a defined geographic location.

In Example 9, the subject matter of Examples 1-8 includes, the communication action performing a voice over IP (VOIP) call, based on a communication session facilitated for the device using the network communications service.

In Example 10, the subject matter of Example 9 includes, the communication destination being an emergence calling service, wherein the communication session is facilitated by an emergency call between the device and the emergency calling service, and wherein the communication session includes an association of the emergency call with the geographic location for the wireless network.

In Example 11, the subject matter of Examples 1-10 includes, the network communications service maintaining a mapping of the access point identification information to a geographic identifier, wherein the indication of the geographic location includes the geographic identifier, and wherein the geographic identifier includes at least one of: global positioning system (GPS) coordinates, a street address, or a building identifier.

Example 12, the subject matter of Examples 1-11 includes, the indication of the geographic location including information that is obtained from an administrator associated with the wireless network.

In Example 13, the subject matter of Examples 1-12 includes, the access point identification information including information of other wireless networks from nearby access points, wherein the geographic location for the wireless network is determined by the network communications service based on a known location of the other wireless networks.

In Example 14, the subject matter of Examples 1-13 includes, performing the communication action by establishing a communication session between the device and a remote device.

In Example 15, the subject matter of Example 14 includes, the communication session between the device and a remote device being initiated in response to verification of the geographic location by the device.

In Example 16, the subject matter of Examples 1-15 includes, the access point identification information identifying die access point of the wireless network to which the device is connected.

In Example 17, the subject matter of Examples 1-16 includes, the access point identification information identifying the access point of the wireless network to which the device will attempt to connect.

Example 18 is a method for association and use of a geographic network location tracked by a network communications service, the method comprising operations performed by a device using at least one hardware processor, the operations comprising, receiving, from a wireless network, access point identification information that identifies an access point of the wireless network to which the device is connected: comparing the access point identification information with a white list, to identify an unmandated status of the access point of the wireless network, wherein the while list includes, identification information of at least one validated access point; communicating, to the network communications service, the access point identification information, receiving, from the network communications service, an indication of a validated status for the access point and an indication of a geographic location for the wireless network: and performing a communication action with the communication service, using the wireless network, in response to receiving the indication of the validated status and the indication of the geographic location, wherein the communication action includes providing the geographic location for the wireless network from the device to a communication destination.

In Example 19, the subject matter of Example 18 includes, the wireless network operating in accordance with an IEEE 802.11 standard, wherein the access point identification information includes a MAC address of the access point.

In Example 20, the subject matter of Example 19 includes, the MAC address being received as an encrypted value.

In Example 21, the subject matter of Examples 18-20 includes, the access point identification information including a certificate issued for the wireless network.

In Example 22, the subject matter of Examples 18-21 includes, the access point being a cellular network station operating according to a cellular network standard, wherein me access point identification information comprises identifier information for the cellular network station.

In Example 23, the subject matter of Examples 18-22 includes, the white list being stored in a memory of the device, with the operations further comprising: updating the white list, in response to receiving the indication of the validated status for the access point, wherein the while list is updated to include at least one identifier of the access point of the wireless network.

In Example 24, the subject nuttier of Examples 18-23 includes, comparing the access point identification information with the while list, being performed by evaluating at least one characteristic of the wireless network with at least one characteristic stored in the white list, wherein the at least one characteristic stored in the white list relates to at least one of: identifiers of wireless networks operating in proximity to the wireless network: a number of wireless networks operating in proximity to the wireless network, service information associated with the access point, vendor information associated with the access point, or location information associated with the access point.

In Example 25, the subject matter of Examples 18-24 includes, the indication of the geographic location being provided by the network communications service, in response to a determination by the network communications service that the access point identification information is associated with a defined geographic location.

In Example 26, the subject matter of Examples 18-25 includes, the communication action performing a voice over IP (VOIP) call based on a communication session facilitated for the device using the network communications service.

In Example 27, the subject matter of Example 26 includes, the communication destination being an emergency calling service, wherein the communication session is facilitated by an emergency call between the device and the emergency calling service, and wherein the communication session includes an association of the emergency call with the geographic location for the wireless network.

In Example 28, the subject matter of Examples 18-27 includes, the network communications service maintaining a mapping of the access point identification information to a geographic identifier, wherein the indication of the geographic location includes the geographic identifier, and wherein the geographic identifier includes at least one of: global positioning system (GPS) coordinates, a street address, or a building identifier.

In Example 20, the subject matter of Examples 18-28 includes, the indication of the geographic location including information that is obtained from an administrator associated with the wireless network.

In Example 30, the subject matter of Examples 18-29 includes, the access point identification information including information of other wireless networks from nearby access points, and wherein the geographic location for the wireless network is determined by the network communications service based on a known location of the other wireless networks.

In Example 31, the subject matter of Examples 18-30 includes, performing the communication action by establishing a communication session between the device and a remote device.

In Example 32, the subject matter of Example 31 includes, the communication session between the device and a remote device being initiated m response to verification of the geographic location by the device.

In Example 33, the subject matter of Examples 18-32 includes, the access point identification information identifying the access point of the wireless network to which the device is connected.

In Example 34, the subject matter of Examples 18-33 includes, the access point identification information identifying the access point of the wireless network to which the device will attempt to connect.

Example 35 is a machine-readable storage medium including instructions, wherein the instructions, when executed by one or more processors of a device, cause the one or more processors to perform the operations of any of Examples 18 to 34.

Example 36 is a system comprising means for receiving, from a wireless network, access point identification information that identifies an access point of the wireless network to which a device is connected; means for comparing the access point identification information with a white list, to identify an unvalidated slams of the access point of the wireless network, wherein the white list includes, identification information of at least one validated access point; means for communicating, to a network communications service, the access point identification information; means for receiving, from the network communications service, an indication of a validated status for the access point and an indication of a geographic location for the wireless network; and means for performing a communication action with the communication service, using the wireless network, in response to receiving the indication of the validated status and the indication of the geographic location, wherein the communication action includes providing the geographic location for the wireless network from the device to a communication destination.

In Example 37, the subject matter of Example 36 includes, the wireless network operating in accordance with an IEEE 802.11 standard, wherein the access point identification information includes a MAC address of the access point.

In Example 38, the subject matter of Example 37 includes, the MAC address being received as an encrypted value.

In Example 39, the subject matter of Examples 36-38 includes, the access point identification information Including a certificate issued for the wireless network.

In Example 40, the subject matter of Examples 36-39 includes, the access point being a cellular network station operating according to a cellular network standard, wherein the access point identification information comprises identifier information for die cellular network station.

In Example 41, the subject matter of Examples 36-40 includes, means for storing the white list, and means for updating the white list, in response to receiving the indication of the validated status for the access point, wherein the white list is updated to include m least one identifier of the access point of the wireless network.

In Example 42, the subject matter of Examples 36-41 includes, means for evaluating at least one characteristic of the wireless network with at least one characteristic stored in the white list, wherein the at least one characteristic stored in the white list relates to at least one of: identifiers of wireless networks operating in proximity to the wireless network, a number of tireless networks operating in proximity to the wireless network; service information associated with the access point; vendor information associated with the access point; or location information associated with the access point.

In Example 43, the subject matter of Examples 36-42 includes, the indication of the geographic location being provided by the network communications service, in response to a determination by the network communications service that the access point identification information is associated with a defined geographic location.

In Example 44, the subject matter of Examples 36-43 includes, the communication action performing a voice over IP (VOIP) call, based on a communication session facilitated for the device using the network communications service.

In Example 45, the subject matter of Example 44 includes, the communication destination being an emergence calling service, wherein the communication session is facilitated by an emergency call between the device and the emergency calling service, and wherein the communication session includes an association of the emergency call with the geographic location for the wireless network.

In Example 46, the subject matter of Examples 36-45 includes, the network communications service maintaining a mapping of the access point identification information to a geographic identifier, wherein the indication of the geographic location includes the geographic identifier, and wherein the geographic identifier includes at least one of: global positioning system (GPS) coordinates, a street address, or a building identifier.

In Example 47, the subject matter of Examples 36-46 includes, the Indication of the geographic location including information that is obtained from an administrator associated with the wireless network.

In Example 48, the subject matter of Examples 36-47 includes, the access point identification information including information of other wireless networks from nearby access points, and wherein the geographic location for the wireless network is determined by the network communications service based on a known location of the other wireless networks.

In Example 49, the subject matter of Examples 36-48 includes, performing the communication action by establishing a communication session between the device and a remote device.

In Example 50, the subject matter of Example 49 includes, the communication session between the device and a remote device being initiated in response to verification of the geographic location by the device.

In Example 51, the subject matter of Examples 36-50 includes, the access point identification information identifying the access point of the wireless network to which the device is connected.

In Example 52, the subject matter of Examples 36-51 includes, the access point identification information identifying the access point of the wireless network to which the device will attempt to connect.

Example 53 is a system to implement of any of Examples 1-52.

Example 54 is a method to implement of any of Examples 1-52.

What is claimed is:

1. A client device adapted for association and use of a communication session with a communication destination, depending on a geographic network location of a wireless network tracked by a network communications service, the client device comprising:
    at least one hardware processor;
    communications circuitry adapted for receiving, in the wireless network, access point identification information that identifies an access point of the wireless network; and
    a memory, including instructions, which when executed, cause the hardware processor to perform operations comprising:
        comparing the access point identification information with a white list, to identify an unvalidated status of the access point of the wireless network, wherein the white list includes identification information of at least one validated access point;
        responsive to the identified unvalidated status of the access point, communicating, from the client device to the network communications service, the access point identification information;
        responsive to communicating the access point identification information to the network communication service, receiving, at the client device from the network communications service, an indication of a validated status for the access point and geographic location information for the wireless network, wherein the geographic location information identifies a specific geolocation of the access point and is associated with the access point identification information at the network communications service; and
        performing a communication action in the network communications service, via the communication session established between the client device and the communication destination using the wireless network, in response to communicating the access point identification information to the network communication service, if the client device receives the indication of the validated status and the geographic location information,
    wherein the communication action includes transmitting the geographic location information for the wireless network from the client device to the communication destination via the network communications service, and wherein the specific geolocation of the access point identified in the geographic location information is used to enable and conduct the communication session between the client device and the communication destination, and
    wherein communications between the client device and the communication destination are blocked, if the client device does not receive the indication of the validated status and the geographical location information.

2. The client device of claim 1, wherein the wireless network operates in accordance with a standard from an IEEE 802.11 standards family, and wherein the access point identification information includes a MAC address of the access point.

3. The client device of claim 2, wherein the MAC address is received as an encrypted value.

4. The client device of claim 1, wherein the access point identification information includes a certificate issued for the wireless network.

5. The client device of claim 1, wherein the access point is a cellular network station operating according to a cellular network standard, and wherein the access point identification information comprises identifier information for the cellular network station.

6. The client device of claim 1, wherein the white list is stored in the memory, with the operations further comprising:
    updating the white list, in response to receiving the indication of the validated status for the access point, wherein the white list is updated to include at least one identifier of the access point of the wireless network.

7. The client device of claim 1, wherein comparing the access point identification information with the white list, is performed by evaluating at least one characteristic of the wireless network with at least one characteristic stored in the white list, wherein the at least one characteristic stored in the white list relates to at least one of:
    identifiers of wireless networks operating in proximity to the wireless network;
    a number of wireless networks operating in proximity to the wireless network;
    service information associated with the access point;
    vendor information associated with the access point; or
    location information associated with the access point.

8. The client device of claim 1, wherein the geographic location information is provided by the network communications service, in response to a determination by the network communications service that the access point identification information is associated with the specific geolocation.

9. The client device of claim 1, wherein the communication action includes performing a voice over IP (VoIP) call, based on the communication session facilitated for the client device using the network communications service.

10. The client device of claim 9, wherein the communication destination is an emergency calling service, wherein the communication session is facilitated by an emergency call between the client device and the emergency calling service, and wherein the communication session includes an association of the emergency call with the specific geolocation for the wireless network.

11. The client device of claim 1, wherein the network communications service maintains a mapping of the access point identification information to a geographic identifier of the specific geolocation, wherein the geographic location information includes the geographic identifier, and wherein the geographic identifier includes at least one of: global positioning system (GPS) coordinates, a street address, or a building identifier.

12. The client device of claim 1, wherein the geographic location information includes information that is obtained from an administrator associated with the wireless network.

13. A method for association and use of a communication session with a communication destination, depending on a geographic network location of a wireless network tracked by a communications service, the method comprising operations performed by a client device using at least one hardware processor, the operations comprising:
   receiving, from the wireless network, access point identification information that identifies an access point of the wireless network to which the client device is connected;
   comparing the access point identification information with a white list, to identify an unvalidated status of the access point of the wireless network, wherein the white list includes identification information of at least one validated access point;
   responsive to the identified unvalidated status of the access point, communicating, from the client device to the communications service, the access point identification information;
   responsive to communicating the access point identification information to the communications service, receiving, at the client device from the communications service, an indication of a validated status for the access point and geographic location information for the wireless network, wherein the geographic location information identifies a specific geolocation of the access point and is associated with the access point identification information at the communications service; and
   performing a communication action with the communications service, via the communication session established between the client device and the communication destination using the wireless network, in response to communicating the access point identification information to the communications service, if the client device receives the indication of the validated status and the geographic location information,
   wherein the communication action includes transmitting the geographic location information for the wireless network from the client device to the communication destination via the communications service, and wherein the specific geolocation of the access point identified in the geographic location information is used to enable and conduct the communication session between the client device and the communication destination, and
   wherein communications between the client device and the communication destination are blocked, if the client device does not receive the indication of the validated status and the geographical location information.

14. The method of claim 13, wherein the wireless network operates in accordance with a standard from an IEEE 802.11 standards family, and wherein the access point identification information includes a MAC address of the access point.

15. The method of claim 13, the operations further comprising:
   updating the white list, in response to receiving the indication of the validated status for the access point, wherein the white list is updated to include at least one identifier of the access point of the wireless network.

16. The method of claim 13, wherein comparing the access point identification information with the white list, is performed by evaluating at least one characteristic of the wireless network with at least one characteristic stored in the white list, wherein the at least one characteristic stored in the white list relates to at least one of:
   identifiers of wireless networks operating in proximity to the wireless network;
   a number of wireless networks operating in proximity to the wireless network;
   service information associated with the access point;
   vendor information associated with the access point; or
   location information associated with the access point.

17. A client device for adapted for association and use of a communication session with a communication destination, depending on a geographic network location of a wireless network tracked by a communications service, the client device comprising:
   means for receiving, from the wireless network, access point identification information that identifies an access point of the wireless network;
   means for comparing the access point identification information with a white list, to identify an unvalidated status of the access point of the wireless network, wherein the white list includes identification information of at least one validated access point;
   means for communicating, to a network communications service, the access point identification information, based on the identified unvalidated status of the access point;
   means for receiving, from the network communications service, an indication of a validated status for the access point and geographic location information for the wireless network, based on communicating the access point identification information to the communications service, wherein the geographic location information identifies a specific geolocation of the access point and is associated with the access point identification information at the network communications service; and
   means for performing a communication action in the network communications service, via the communication session established between the client device and the communication destination using the wireless network, in response to communicating the access point identification information to the network communications service, if the client device receives the indication of the validated status and the geographic location information,
   wherein the communication action includes transmitting the geographic location information for the wireless network from the client device to the communication destination via the network communications service, and wherein the specific geolocation of the access point identified in the geographic location information is used to enable and conduct the communication session between the client device and the communication destination, and
   wherein communications between the client device and the communication destination are blocked, if the client device does not receive the indication of the validated status and the geographical location information.

18. The client device of claim 17, wherein the wireless network operates in accordance with a standard from an IEEE 802.11 standards family, and wherein the access point identification information includes a MAC address of the access point.

19. The client device of claim 17, further comprising:
   means for storing the white list; and
   means for updating the white list, in response to the indication of the validated status for the access point, wherein the white list is updated to include at least one identifier of the access point of the wireless network.

20. The client device of claim 17, further comprising:
   means for evaluating at least one characteristic of the wireless network with at least one characteristic stored in the white list, wherein the at least one characteristic stored in the white list relates to at least one of:
identifiers of wireless networks operating in proximity to the wireless network;
a number of wireless networks operating in proximity to the wireless network;
service information associated with the access point;
vendor information associated with the access point; or
location information associated with the access point.

* * * * *